C. KNUTSON.
RECEPTACLE.
APPLICATION FILED APR. 8, 1913.
1,163,017.
Patented Dec. 7, 1915.
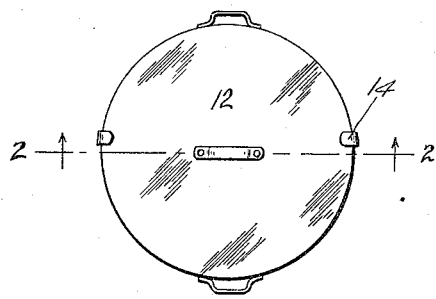
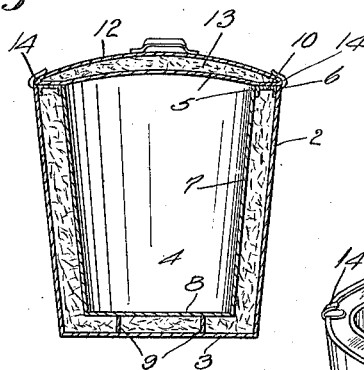
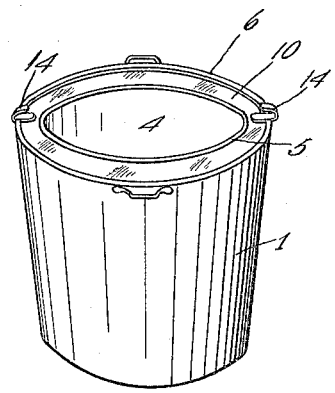
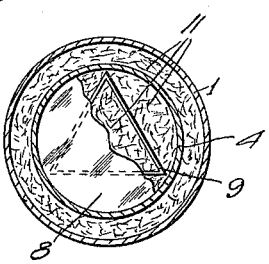
WITNESSES:
H. L. Opsahl.
Horace Barnes
INVENTOR
Chris Knutson.
Gene Barnes
ATTORNEY

UNITED STATES PATENT OFFICE.

CHRIS KNUTSON, OF SEATTLE, WASHINGTON.

RECEPTACLE.

1,163,017. Specification of Letters Patent. Patented Dec. 7, 1915.

Application filed April 8, 1913. Serial No. 759,811.

*To all whom it may concern:*

Be it known that I, CHRIS KNUTSON, a citizen of the United States, residing at Seattle, in the county of King and State of Washington, have invented certain new and useful Improvements in Receptacles, of which the following is a specification.

The object of this invention is the provision of a simple and inexpensive container for bread-dough wherein the temperature of the material received therein may be kept at a practically uniform point for the considerable period of time required for germination and development of the yeast in raising the dough and require but little attention from the housewife in maintaining the proper warmth.

The invention consists in the novel construction of a domestic utensil and combination and adaptation therewith of parts and devices, as will be fully explained in the following specification, illustrated in the accompanying drawings, and finally set forth in the appended claim.

In said drawings, Figure 1 is a perspective view of a container with the cover removed, of an embodiment of my invention. Fig. 2 is a vertical sectional view of the same, including the cover, on line 2—2 of Fig. 3. Fig. 3 is a top plan view. Fig. 4 is a cross-sectional view of the invention showing the bottom partly broken away.

In said drawings, the reference numeral 1 designates an outer casing comprised of side walls 2 and bottom 3 of suitable metallic construction.

4 indicates an inner vessel plunged within said casing with its upper marginal edge 5 in approximately the same horizontal plane as the similar edge 6 of the casing. The side walls 7 of said vessel are spaced apart from the walls 2 to afford an annular space therebetween. Similarly, the bottom 8 of the vessel is spaced above the bottom 3 of the casing and is supported therefrom by a metal strip, shown at 9, formed of triangular configuration and secured symmetrically at its opposite edges between said vessel and casing. Said edges 5 and 6 are rigidly connected together in evenly spaced relation by an annular plate 10 sealing the space between the vessel and casing. The entire space between the vessel and casing is desirably filled with a material, as indicated at 11, of low heat conductivity, such as cotton or other fibrous material.

A cover 12 is provided for the container of analogous double construction which is filled with non-conducting material 13. Said cover is adapted to closely fit the top of the container and is secured in tight condition therewith by a pair of one-piece L-shaped spring-clips 14 rigidly positioned and countersunk upon opposite sides thereof slightly to one side of a line projected through the vertical axis of the container and having broad base portions over said annular plate and approaching the edge 5. The cover is secured in operative position by sliding the same between said clips in the direction indicated by the darts in Fig. 3, whereupon said clips press the cover upon the container. As said cover is proportioned of somewhat larger diameter than the distance between said clips, the cover is prevented from being pushed through the same and is held in its proper operative position.

The manner of utilizing the device will be readily understood. Bread-dough may be mixed and set to raise in the vessel and the warmth imparted to it by the housewife will be conserved for a considerable period, while the dough is undergoing such process.

With this device, necessity of wrapping the dough container with cloths to maintain the temperature may be dispensed with. Similarly, the device may be employed for analogous uses that will be readily understood.

Having described my invention, what I claim, is—

A bread raiser comprising in combination with a double walled receptacle having an annular plate between said walls and slightly spaced below the top thereof, of one-piece spring clips positioned above said plate upon opposite sides of and secured in the outer wall, both of said clips lying upon the same side of a plane passed through the central vertical axis of the container, flattened base portions of said clips overlying said plate approaching and spaced from the inner wall and their upper shorter portions adapted to impinge upon the outer surface of a cover member slidably positionable upon said base portions and the tops of said walls.

Signed at Seattle, Wash., this 25th day of March, 1913.

CHRIS KNUTSON.

Witnesses:
E. PETERSON,
HORACE BARNES.